June 15, 1943.   S. W. ALDERFER   2,321,725
CUTTER FOR CITRUS FRUITS
Filed May 23, 1941
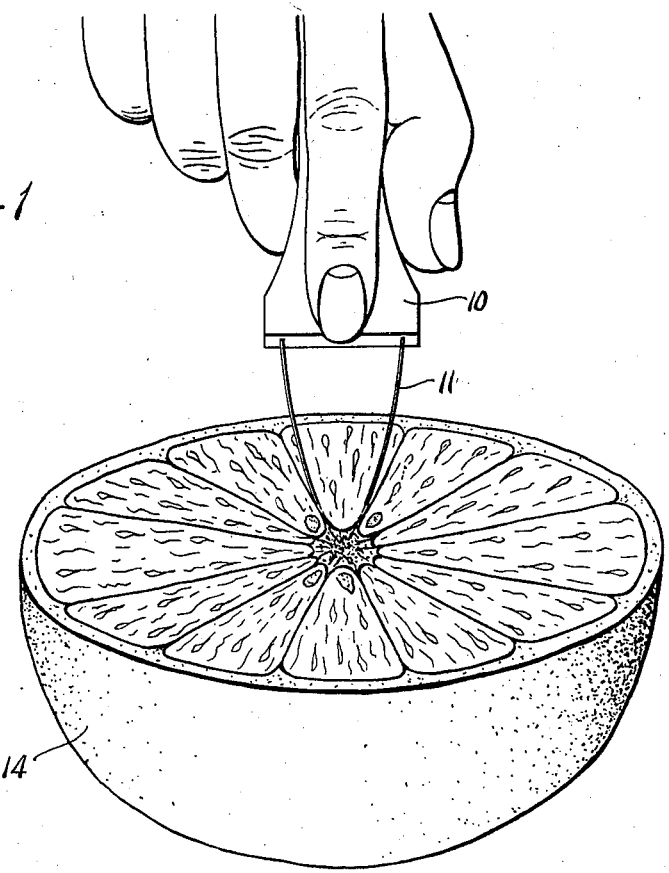
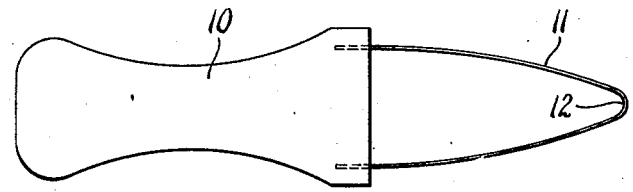
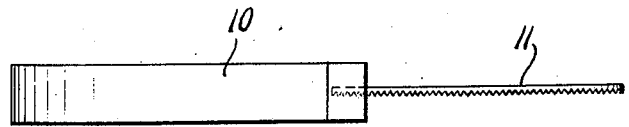
INVENTOR
STERLING W. ALDERFER
BY
ATTORNEYS Patented June 15, 1943

2,321,725

UNITED STATES PATENT OFFICE 2,321,725

CUTTER FOR CITRUS FRUITS

Sterling W. Alderfer, Akron, Ohio

Application May 23, 1941, Serial No. 394,872

2 Claims. (Cl. 30—24)

This invention relates to cutters for citrus fruits such as grapefruit and oranges, and more especially it relates to cutters for separating the pulp of the fruit from the natural integuments that surround the respective segments of the fruit.

The invention is designed primarily for household use in the preparation of citrus fruit for human consumption. In such cases it is customary to cut the fruit, for example, a grapefruit, into two halves, the plane of cleavage being transverse to the axis of the fruit. Then the exposed seeds are removed and the juice-cell groups separated from their surrounding integuments. For this purpose a knife having a blade slightly curved at its end is the most efficient yet provided. Such knives, however, even in the hands of a skillful user frequently leave portions of the pulp unsevered from the integuments, with the result that difficulty and annoyance is experienced when it is attempted subsequently to remove the pulp sections from the fruit-rind by means of a spoon. It is to the solution of this difficulty that this invention primarily is directed.

The chief objects of the invention are to provide an improved cutter for separating demi-segments of citrus fruit pulp from the integuments that substantially envelop the same; to provide a cutter of the character mentioned that will completely sever the pulp from the integuments; to provide a cutter of the character mentioned that is simple in operation and may be efficiently employed by unskilled persons; and to provide such a cutter of simple construction and low cost. Other objects will be manifest as the description proceeds.

Of the accompanying drawing:

Fig. 1 is a perspective view of the improved cutter showing the same as it is used to separate the pulp from the surrounding integument of a segment of grapefruit;

Fig. 2 is a plan view of the cutter; and

Fig. 3 is a side elevation thereof.

Referring to the drawing, there is shown a citrus fruit cutter consisting of a handle 10 and a blade 11. The handle 10 may be made of wood, molded plastic, or any other suitable or desired material having the necessary stiffness. The blade 11 is composed of a single length of flat metal wire bent to the form of a loop and having its ends secured in one end of the handle 10, said ends being relatively widely spaced apart from each other. The blade-loop 11 preferably has the general outline of the pointed arch, that is, the opposite legs of the loop may be slightly arcuate longitudinally and converge outwardly from the handle toward the medial region of the loop where they connect with each other, said medial region being arcuate about a relatively small radius to provide a nose 12. An important feature of the invention is that the blade wire 11 is relatively narrow, as shown in Fig. 3, being about 1/16 inch in width. In thickness the blade is relatively thin, being less than 1/32nd inch thick. The blade is composed of tempered steel, and may have a modicum of resilience. The blade is shown in Fig. 3 as having a single serrated cutting edge throughout its entire length, but both margins of the blade may be serrated if desired. It is also contemplated that one or both margins of the blade may be beveled to provide cutting edges, or one margin may be serrated and the other beveled.

The cutter is used in the manner depicted in Fig. 1. The grapefruit is cut transversely to provide half-sections, such as shown at 14 in said figure. The cutter may then be used to dislodge any seeds that are exposed by the cut. The cutter is then applied to the fruit by placing the nose 12 of the cutter at the apex of a generally triangular fruit-segment, within the integument enveloping said segment, and then bearing downwardly on the cutter while exerting a slight sawing action. As the nose of the cutter reaches the bottom of the fruit-rind, the cutter is moved radially outwardly toward the perimeter of the rind. As the cutter nears the perimeter of the rind it is turned so that one leg of the blade traverses the outermost part of the fruit-segment adjacent the rind. In its final position the cutter is so disposed that the plane of its blade is radially of the fruit. Withdrawal of the blade from the fruit severs any remaining pulp that may be attached to an integument, it being understood that the entire cutting action is effected by a slight reciprocating or sawing action of the blade. The operation is then repeated in other segments of the fruit until all the pulp-cell groups are severed from their enveloping integuments.

In separating the pulp groups from the integuments, most of the juice-cells along the lines of cut are ruptured and broken, thus allowing some juice to accumulate. This is not objectionable, however, since some juice is desired for dissolving sugar that may be added to the fruit to sweeten the same. Thereafter the pulp-sections readily may be removed from the fruit by means of a spoon, and eaten.

The improved cutter is extremely simple in construction and operation, and achieves the several advantages set out in the foregoing statement of objects.

Modification may be resorted to without departing from the spirit of the invention or the scope thereof as defined by the appended claims.

What is claimed is:

1. A cutter for separating the pulp of citrus fruit from the natural integuments that surround the pulp segments of the fruit, said cutter comprising a handle, and a blade consisting of a flat metal wire formed with a cutting edge, said blade having its respective ends mounted in one end of the handle in spaced apart relation, and formed intermediate its ends in a loop, the sides of which converge toward a rounded nose.

2. A cutter for separating the pulp of citrus fruit from the natural integuments that surround the pulp segments of the fruit, said cutter comprising a handle, and a blade consisting of a flat wire of tempered metal having a modicum of resilience, said blade being shaped in a loop with its ends anchored in an end of the handle in spaced apart relation, one margin of the blade at least being provided with a cutting edge.

STERLING W. ALDERFER.